US008081878B1

(12) United States Patent
Zhang et al.

(10) Patent No.: US 8,081,878 B1
(45) **Date of Patent: *Dec. 20, 2011**

(54) REMOTE CONTROL CAPTURE AND TRANSPORT

(75) Inventors: Xiaoru Zhang, San Jose, CA (US); William J. McFarland, Los Altos, CA (US); Atul Divekar, West Lafayette, IN (US)

(73) Assignee: Qualcomm Atheros, Inc., San Jose, CA (US)

( * ) Notice: Subject to any disclaimer, the term of this patent is extended or adjusted under 35 U.S.C. 154(b) by 129 days.

This patent is subject to a terminal disclaimer.

(21) Appl. No.: 12/409,423

(22) Filed: Mar. 23, 2009

Related U.S. Application Data

(63) Continuation of application No. 11/197,122, filed on Aug. 3, 2005, now Pat. No. 7,529,486.

(60) Provisional application No. 60/602,722, filed on Aug. 18, 2004.

(51) Int. Cl.
*H04B 10/00* (2006.01)

(52) U.S. Cl. .......................... 398/106; 398/58; 398/107

(58) Field of Classification Search .................... 398/58, 398/66, 70–72, 74, 106–107
See application file for complete search history.

(56) References Cited

U.S. PATENT DOCUMENTS

| | | | | |
|---|---|---|---|---|
| 2002/0194621 | A1 * | 12/2002 | Tran et al. | 725/139 |
| 2004/0137878 | A1 * | 7/2004 | Oyama | 455/411 |
| 2004/0157555 | A1 * | 8/2004 | Richenstein et al. | 455/39 |
| 2004/0172651 | A1 * | 9/2004 | Wasilewski et al. | 725/46 |
| 2004/0242224 | A1 * | 12/2004 | Janik et al. | 455/426.1 |
| 2005/0238164 | A1 * | 10/2005 | Leung | 379/355.02 |
| 2007/0171091 | A1 * | 7/2007 | Nisenboim et al. | 340/825.69 |

* cited by examiner

*Primary Examiner* — Dzung Tran

(74) *Attorney, Agent, or Firm* — Bever, Hoffman & Harms, LLP; Jeanette S. Harms

(57) ABSTRACT

A system and method for wirelessly transmitting both real-time data streams and remote control signals is described. A first transceiver can be used for detecting remote control signals associated with an end device (e.g. a television), transforming these remote control signals into wireless signals, and transmitting the wireless signals. A second transceiver can be used for receiving the wireless signals and transforming the wireless signals into the recreated remote control signals. The recreated remote control signals can then be sent to a source device (e.g. a DVD player). Because wireless signals are used (instead of infrared (IR) signals, for example), the source device can be outside the line of sight of the end device and still respond to the remote control signals.

30 Claims, 7 Drawing Sheets

REMOTE CONTROL CAPTURE AND TRANSPORT

RELATED APPLICATIONS

This application is a continuation of U.S. patent application Ser. No. 11/197,122, entitled "Remote Control Capture And Transport" filed Aug. 3, 2005 which claims priority of U.S. Provisional Patent Application 60/602,722, entitled "Remote Control Capture And Transport" filed Aug. 18, 2004.

BACKGROUND OF THE INVENTION

1. Field of the Invention

The present invention relates to data communication and, more particularly, to data communication wherein control signals sent by a remote controller are detected, encoded, and transmitted to a device using a wireless communication network.

2. Description of the Related Art

Wireless networking can now advantageously provide the wireless distribution of entertainment streaming media to consumers. For example, the Sharp model LC-15L1U-S television can receive streaming audio/video streams from a DVD player using an IEEE-802.11b-based wireless network. Unfortunately, in many cases, if the display device (e.g. the Sharp television) is out of the line-of-sight of the source device (e.g. the DVD player), then the ability to control the source device using a remote control (e.g. implemented with infrared (IR) technology) is lost.

To solve this problem, some vendors, such as satellite DTV receiver makers, have provided UHF wireless remote controls to allow control of such source devices using satellite technology. However, this service is provided at considerable, additional cost to consumers, thereby limiting its acceptance in the marketplace.

Therefore, a need arises for a means of capturing and communicating remote control commands in a networked digital media transport system.

SUMMARY OF THE INVENTION

In accordance with one aspect of the invention, a system designed to transport streaming digital media streams can also advantageously capture and transport remote control signals from an end device to a source device. In one embodiment, the end device can be an LCD television (TV) equipped with a digital wireless networking transceiver and the source device can be a DVD player equipped with another digital wireless networking transceiver. The transceiver connected to the end device can detect, capture, and transform a remote control signal (e.g. an infrared control signal) from a remote controller into a wireless signal. The transceiver connected to the source device can receive that wireless signal and transform it back into a recreated remote control signal. This recreated remote control signal can then be sent to the source device. Because the transceivers can be used to send/receive the remote control signals as wireless signals, instead of using a standard line of sight technology (e.g. infrared, acoustic, or visible light) or wired technology, the remote controller and end device can be outside the line of sight of the source device and still send the source device remote control signals.

Advantageously, the remote control signal and the recreated remote control signal need not be "interpreted" by the transceivers (also called intermediate devices). Rather, the remote control signals can be advantageously detected, captured, and transformed without knowing the substance of such commands. In this way, the transceivers can be made relatively "future-proof," i.e. a new source device and/or end device can be installed without the need to upgrade the transceivers.

In one embodiment, a transceiver can be programmed to act as a receiver or as a transmitter of the remote control signal. Each transceiver can include an IR LED and photodiode, a data FIFO, and IR logic. The IR LED and photodiode can be used for receiving the remote control signal or transmitting the recreated remote control signal. The data FIFO can be used for storing the remote control signal or the recreated remote control signal. The IR logic can be used for transforming the remote control signal or the wireless signal.

Each transceiver can include a first control register that stores transceiver functionality bits. This first control register can store the bits that determine whether the IR logic acts as a transmitter or a receiver. In one embodiment, each transceiver can further include a second control register that stores the operational bits for receiving the remote control signal. These operational bits can include a first set of bits for specifying a sequence start window value, a second set of bits for specifying a sequence start threshold value, a third set of bits for specifying a sequence end unit value, a fourth set of bits for specifying a sequence end threshold value, a fifth set of bits for specifying a sequence end window value, and a sixth set of bits for specifying an end of sequence threshold value.

In one embodiment, all the steps of the method can be implemented by computer readable program code included in a computer program product. The computer program product can be embodied in a program storage device.

In accordance with another aspect of the invention, a method of processing a remote control signal is provided. In this method, the remote control signal can be received using a line of sight technology or a wired technology. At this point, the remote control signal can be transformed into a wireless communication, wherein the wireless communication uses a radio frequency technology. In accordance with another aspect of the invention, a method of processing a wireless communication is provided. In this method, the wireless communication can be received using a radio frequency technology. At this point, the wireless communication can be transformed into a remote control signal, the remote control signal using a line of sight technology or a wired technology. The line of sight technology could be an infrared, acoustic, visible light, or ultra-low-power RF signal (e.g. Bluetooth) technology. The wireless communication can advantageously conform to the IEEE 802.11 standard.

A system for processing one or both of the remote control signal and the wireless communication can be provided. In one embodiment, the system can be implemented on at least one integrated circuit. The system can be implemented as a transceiver, receiver, or transmitter.

DETAILED DESCRIPTION OF THE FIGURES

Figure 1:
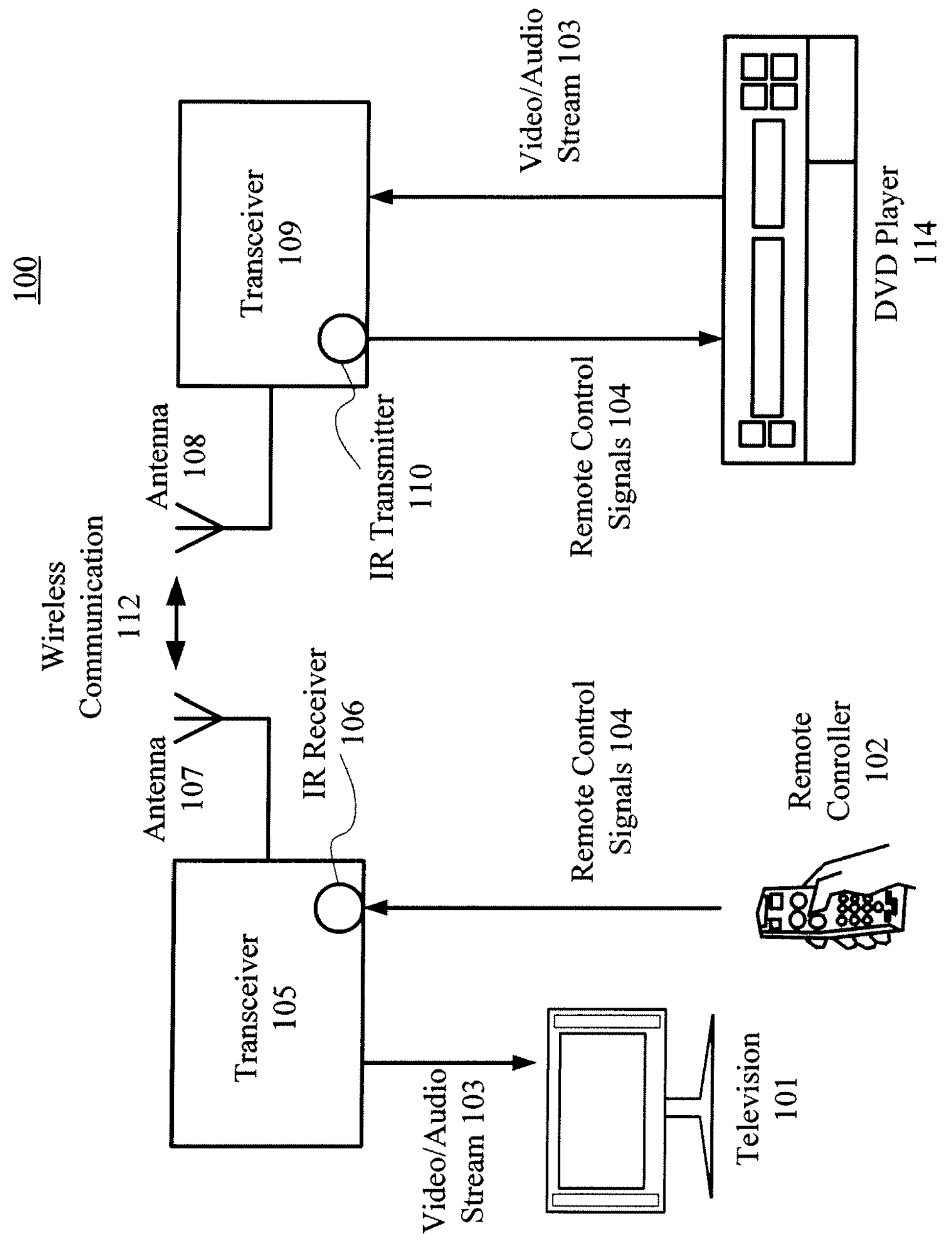
FIG. 1 illustrates a block diagram of an exemplary wireless streaming media system.

In accordance with one aspect of the invention, a system designed to transport a streaming digital media stream from a source device (e.g. a DVD player) to an end device (e.g. a television) can also advantageously and cost effectively capture and transport remote control signals to the source device even when the source device is outside the line of sight of the end device. For example, FIG. 1 illustrates an exemplary wireless media system 100 including a television 101 (generically called an end device) and a DVD player 114 (generically called a source device). In system 100, DVD player 114 can send a video/audio stream 103 (e.g. an MPEG-2 stream) to television 101 using a pair of wireless networking transceivers.

Specifically, a transceiver 109 coupled to DVD player 114 can receive video/audio stream 103. After appropriate modification of video/audio stream 103 (see, for example, the IEEE 802.11 family of standards for general modifications), transceiver 109 can transmit a wireless communication 112 that includes video/audio stream 103 over an antenna 108. (Note that such modifications can also include, for example, synchronization packets interspersed with data packets including video/audio stream 103. These synchronization packets are discussed in U.S. patent application Ser. No. 11/197,773 [ATH-0159], entitled "Media Streaming Synchronization", filed on Aug. 3, 2005 by Atheros Communications, Inc., and incorporated by reference herein.) A transceiver 105 coupled to television 101 can receive wireless communication 112 using an antenna 107. After extracting video/audio stream 103 from wireless communication 112, transceiver 105 can forward the stream to television 101.

Transceiver 105 can include an IR receiver 106, which can receive remote control signals 104 from a remote controller 102. Transceiver 109 can include an IR transmitter, which transmits remote control signals 104 to DVD player 114. Notably, in accordance with one aspect of the invention, remote control signals 104 can be transmitted using wireless communication 112.

Specifically, transceiver 105 can advantageously detect and capture remote control signals 104. Transceiver 105 can then encode and transmit the IR control signals via antenna 107 in wireless communication 112. Transceiver 109, using its antenna 108, can receive wireless communication 112, which can include remote control signals 104. At this point, transceiver 109 can reproduce remote control signals 104 and transmit such signals to DVD player 114 using IR transmitter 110.

In one embodiment, remote control signals 104 are not "understood" (i.e. acted upon as commands) or "interpreted" by transceivers 105 and 109. Rather, remote control signals 104 can be advantageously detected, captured, and transformed without knowing the substance of such commands. In this way, the transceivers 105 and 109 (described in further detail in reference to FIG. 2) can be made relatively "future-proof," e.g. a new DVD player or television may be installed without the need to upgrade transceivers 105 or 109. Notably, certain registers in transceivers 105 or 109 can be programmed to store appropriate values (described in reference to FIG. 2 and Table 2) to accurately detect the start/end of such remote control signals.

In one embodiment, remote control signals 104 can be transmitted in real time concurrently with video/audio stream 103. Because these network communications are performed over a shared medium, care is taken to avoid delays in transmitting video/audio stream 103. In other words, streaming data typically takes precedence over other communications. However, remote control signals 104 could include, for example, a stop command, which should take priority over video/audio stream 103. Therefore, in one embodiment, a plurality of variable-priority data communication queues can be maintained, wherein a higher priority queue for transmission of remote control signals 104 can be selected. These queues are described in further detail in a co-pending U.S. patent Ser. No. 10/429,980, entitled, "UNIFIED QOS QUEUE ARCHITECTURE", filed May 2, 2003, and incorporated by reference herein.

Figure 2:
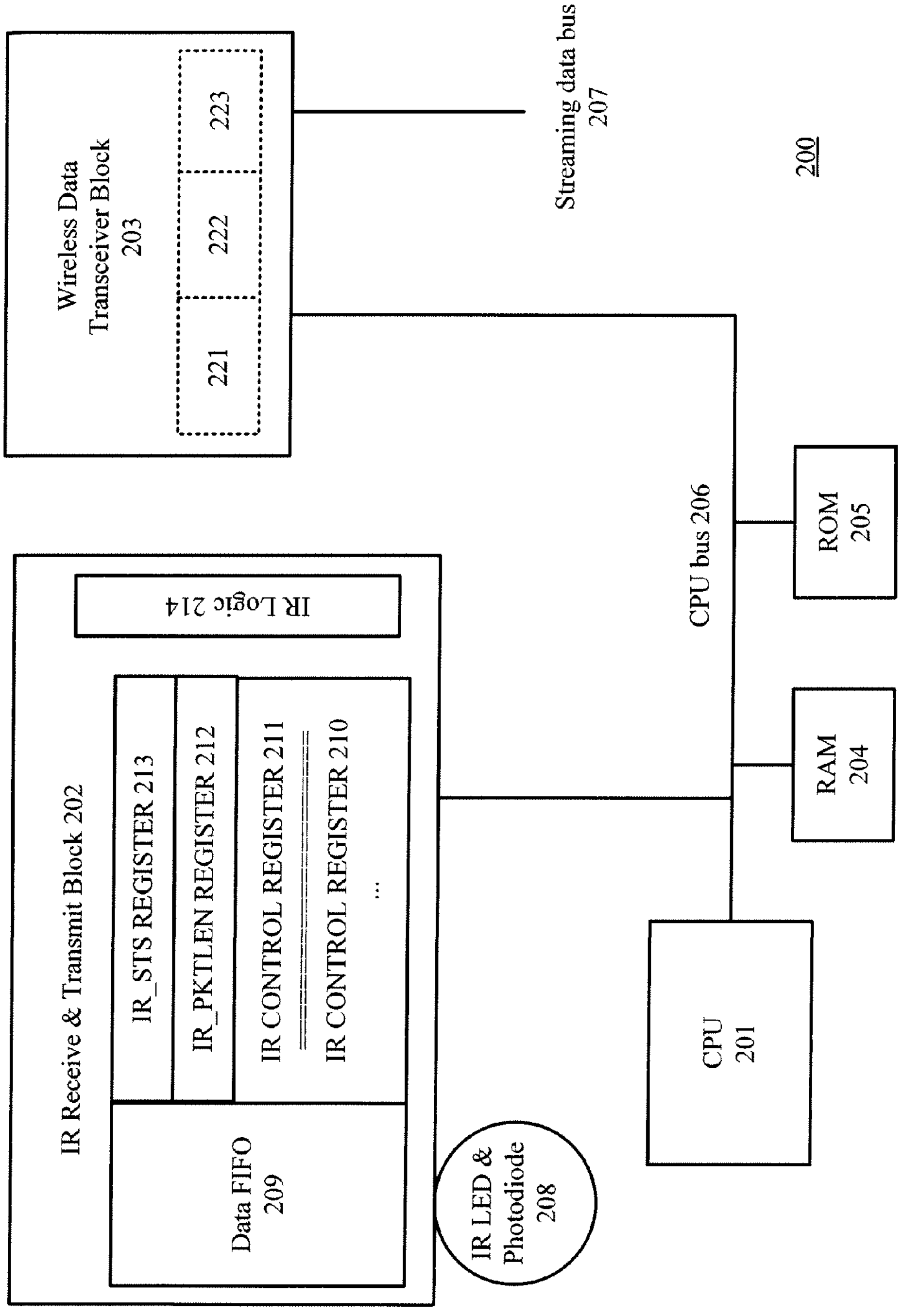
FIG. 2 illustrates a block diagram of a transceiver for implementation in the wireless streaming media system of FIG. 1.

FIG. 2 illustrates a simplified block diagram of a transceiver 200. In transceiver 200, a streaming data bus 207 may be used for transmitting of wireless communication 112 (FIG. 1). In one embodiment, streaming data bus 207 can be controlled by, but not coupled to CPU 201, using wireless data transceiver block 203. Note that the general functions of transceiver block 203 are described in the 1999 IEEE 802.11a, b, and g family of standards (see, for example, Section 18 of 802.11b, and Sections 17 and 19 of 802.11g).

A CPU 201 can control an IR receive & transmit block 202, a wireless data transceiver block 203, a random access memory (RAM) 204, and a read only memory (ROM) 205 via a CPU bus 206. In accordance with one aspect of the invention, CPU 201 can run software (stored in non-volatile form in ROM 205 and temporarily stored in RAM 204) for reading and writing data to a plurality of control registers in IR receiver & transmit block 202. For example, in one embodiment, IR control registers 210 and 211 can store control bits associated with IR control (described below in reference to Tables 1 and 2). In one embodiment, the writing of such control bits can be performed during a system set-up time.

Table 1 indicates exemplary control bits that can be stored in IR control register 210.

TABLE 1

IR Control Register 210

| Bits | Function |
|---|---|
| 0 | Transmitter/receiver select |
| 13:1 | Clock divisor value |
| 24:14 | IR output clock divisor value |
| 31:26 | Reserved |

As indicated in Table 1, bit 0 of IR control register 210 can determine whether IR logic 214 of IR receive & transmit block 202 functions as a transmitter or a receiver, thereby allowing transceiver 200 to implement either transceiver 105 or transceiver 109 (FIG. 1). In one embodiment, a "0" value indicates that IR logic 214 acts as a transmitter, whereas a "1" value indicates that IR logic 214 acts as a receiver. In one embodiment, a default/reset value can be "1". Note that an IR LED & photodiode 208 can communicate with either remote controller 102 or DVD player 114 (FIG. 1). For example, IR LED & photodiode 208 can simply forward signals to a data FIFO 209 in IR receive & transmit block 202 when received from a device external to transceiver 200. Alternatively, IR LED & photodiode 208 can forward signals from data FIFO 209 to a device external to transceiver 200 when requested by IR receive & transmit block 202.

Referring back to Table 1, bits 13:1 of IR control register 210 can determine a 24 kHz clock divisor value. Specifically, this field can specify the number of APB (advanced peripheral bus) clock (pclk) cycles in one IR sampling clock period. In one embodiment, an IR control data reception of 24 kHz sampling rate can be used. Thus, if pclk is 100 MHz, then bits 13:1 should be set to (100e6/24e3)=4167.

Note that the data being sampled is the demodulated, detected IR signal from IR LED & photodiode 208 (FIG. 2). Remote controller 102 (FIG. 1) typically transmits from 1.5 to 2.4 kbits/sec, which is then modulated onto a 38 kHz carrier signal. Therefore, the 24 kHz sampling rate can advantageously provide a sampling rate at least 10-times the rate of the data being transmitted.

Bits 25:14 of IR control register 210 can determine an IR output clock divisor value, i.e. an output carrier frequency. Specifically, this field can specify the number of APB clock (pclk) cycles in one period of the IR carrier frequency. For example, if pclk is 100 MHz and the IR carrier frequency is 38 kHz, then bits 25:14 should be set to (100e6/38e3)=2632. Note that in this embodiment, bits 31:26 can be reserved.

Table 2 indicates exemplary control bits that can be stored in IR control register 211.

TABLE 2

| IR Control Register 211 | |
|---|---|
| Bits | Function |
| 0 | Input polarity inversion enable |
| 1 | Output polarity inversion enable |
| 2 | Sequence start window select |
| 7:3 | Sequence start threshold |
| 8 | Sequence end unit select |
| 14:9 | Sequence end unit threshold |
| 15 | Sequence end window select |
| 20:16 | End of sequence threshold |
| 24:21 | Number of back-off words |
| 34:25 | Reserved |

As indicated in Table 2, bit 0 of IR control register 211 can determine whether an input IR polarity inversion enable is set. In one embodiment, a “0” value (a default value) indicates that the input IR signal polarity is not inverted, whereas a “1” value indicates that the input IR signal polarity is inverted. Note that bit 0 can be optional.

Bit 1 of IR control register 211 can determine whether an output IR polarity inversion enable is set. In one embodiment, a “0” value (a default value) indicates that the output IR signal polarity is not inverted, whereas a “1” value indicates that the input IR signal polarity is inverted. Note that bit 1 can also be optional.

Figure 3:
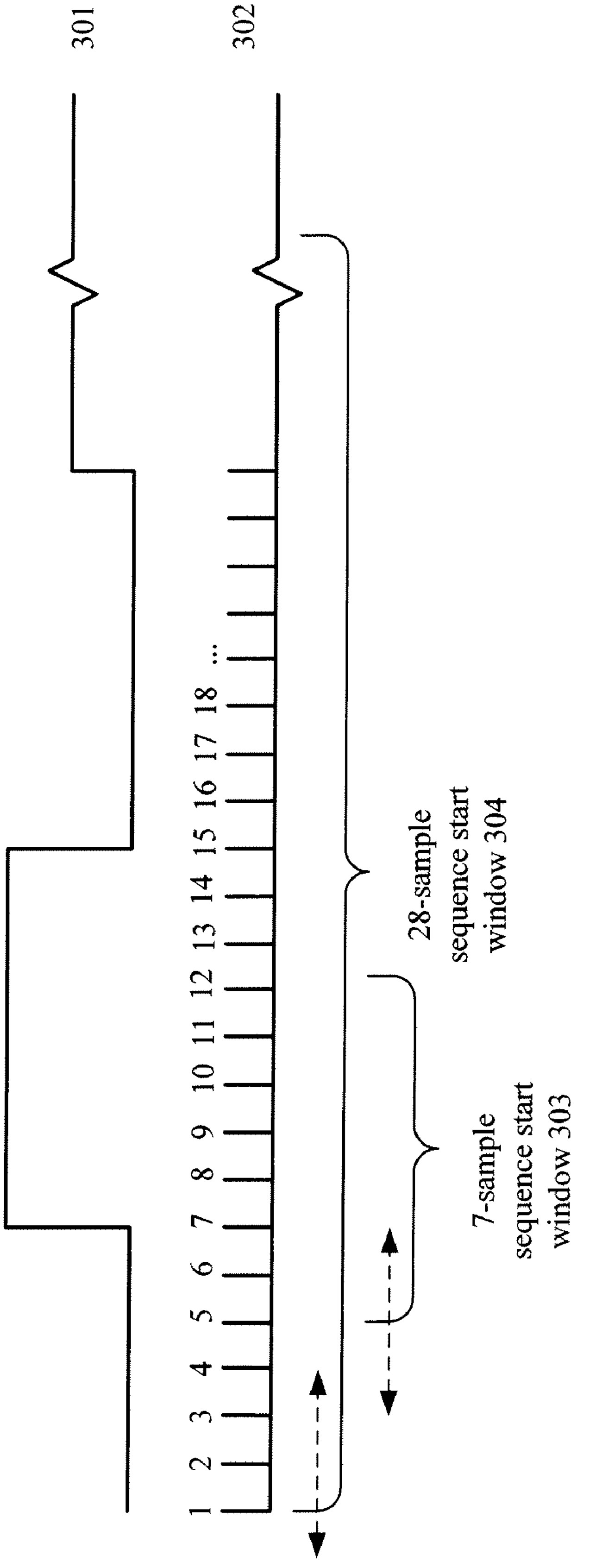
FIG. 3 illustrates a timeline diagram of an IR received signal and exemplary sequence start windows for detecting the start of an IR control signal.

Bit 2 of IR control register 211 can select a sequence start window, i.e. the number of successive samples used to detect a start of an IR sequence. FIG. 3 illustrates two exemplary sequence start windows for a received IR data stream 301 using a sampling clock 302 (e.g. 24 kHz). Note that the sampling of received IR data stream 301 can occur after removal of a carrier frequency imposed on the IR signal by remote controller 102 (FIG. 1). For example, as indicated above, a 38 kHz carrier frequency carrier signal may be used.

The start of an IR sequence may be detected by checking a number of successive samples saved in data FIFO 209 (FIG. 2), which can be advantageously continuously running.

In one embodiment, the start of an IR sequence may be detected by checking 7 successive samples as indicated in 7-sample sequence start window 303 (the arrow indicating that these successive samples could be taken at any point). In another embodiment, the start of an IR sequence may be detected by checking 28 successive samples as indicated in 28-sample sequence start window 304 (once again, the arrow indicating that these successive samples could be taken at any point). Note that checking more successive samples indicates a more rigorous (i.e. more immune to error) system.

In one embodiment, a “0” value (a default/reset value) in bit 2 of IR control register 211 can trigger IR receive & transmit block 202 (FIG. 2) to check for 7 successive samples to detect the start of an IR sequence. A “1” value in bit 2 of IR control register 211 can trigger IR receive & transmit block 202 to check for 28 successive samples to detect the start of an IR sequence.

An IR signal start is confirmed if at least a certain number of samples are high (logically “true”) out of the total samples checked (e.g. 7 or 28). Referring to Table 2, bits 7:3 of IR control register 211 can indicate this sequence start threshold. If the number of high samples is equal to or greater than the threshold value, then a “high unit” is indicated.

Note that the threshold value is logically limited by the sequence start window value. In other words, if the sequence start window is set to 7, then the threshold value must be between 1 and 7. Similarly, if the sequence start window is set to 28, then the threshold value must be between 1 and 28. In one embodiment, if the sequence start window is set to 7, then the sequence start threshold can be set (and reset as appropriate) to 4. This testing of successive samples can advantageously minimize false detection of a message start due to, for example, ambient optical noise, yet accommodates transmitted codes having a low density of high samples.

Because detection of a message start takes a predetermined time period, data FIFO 209 can be advantageously used to retrieve samples that otherwise would be lost. Specifically, the predetermined time period can be estimated with respect to the number of samples able to be collected by FIFO 209. Once a message start is detected, IR receive & transmit block 202 can count back to the sample at which it is estimated that the actual samples began.

Figure 4:
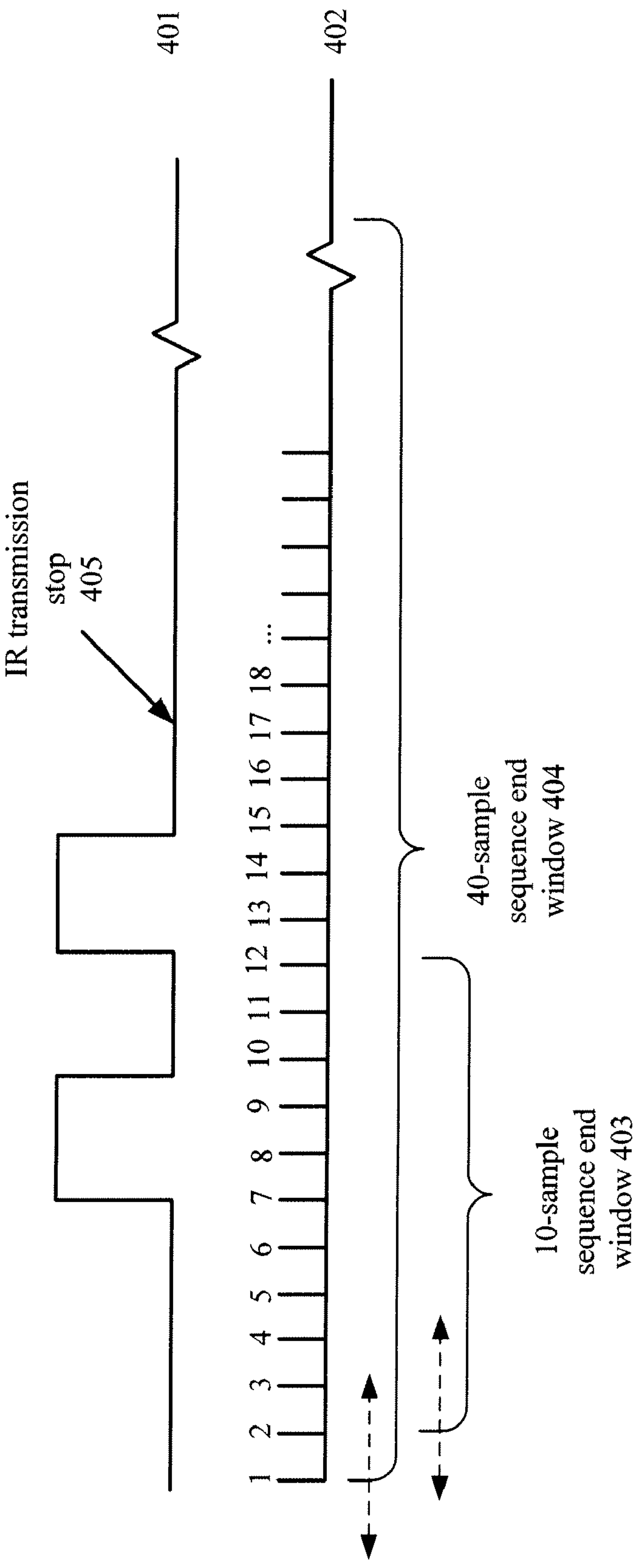
FIG. 4 illustrates a timeline diagram of an IR received signal and exemplary sequence end windows for detecting the end of an IR control signal.

In one embodiment, the end of an IR sequence can be confirmed by determining that at least a certain number of “low units” have been detected. Specifically, if the number of low samples is equal to or greater than a threshold value, then a low unit is indicated. FIG. 4 illustrates two exemplary sequence end windows for a received IR data stream 401 using a sampling clock 402 (e.g. 24 kHz). In one embodiment, a unit can include 10 successive samples as indicated in 10-sample sequence end window 403. In another embodiment, a unit can include 40 successive samples as indicated in 40-sample sequence end window 404. Note that checking more units indicates a more rigorous (i.e. more immune to error) system.

In one embodiment, a “0” value (a default/reset value) in bit 8 (sel_end_seq_unit_win) of IR control register 211 can trigger IR receive & transmit block 202 (FIG. 2) to select 10 successive samples to form a unit. A “1” value in bit 8 of IR control register 211 can trigger IR receive & transmit block 202 to select 40 successive samples to form a unit.

Referring to Table 2, bits 14:9 of IR control register 211 can indicate the number of low samples in a unit that define a low unit. In one embodiment, at least 9 samples of the unit (e.g. 10 samples long) must be low (i.e. 9 is the sequence end unit threshold). In another embodiment, if the unit is 40 samples long, then 36 samples must be low.

Bit 15 (sel_end_seq_win) of IR control register 211 can indicate the number of successive units to check for an IR sequence end. In one embodiment, a "0" value in bit 15 can trigger IR receive & transmit block 202 (FIG. 2) to check 6 units to determine the end of an IR sequence. A "1" value (a default/reset value) in bit 15 can trigger IR receive & transmit block 202 to check 24 units to determine the end of an IR sequence. This testing of multiple units can advantageously mitigate "run-on" of a message due to, for example, ambient noise or transient obscuration, yet accommodates transmitted codes having a low density of high units.

Bits 20:16 (end_seq_thr) of IR control register 211 can indicate the end of sequence threshold. This threshold defines the number of low units out of the total units checked to detect the end IR sequences. In one embodiment, this end of sequence threshold can be 22.

In one embodiment, to conserve high-priority control bandwidth, certain samples stored in data FIFO 209 (FIG. 2) during the detection of an IR control end-of-sequence may be automatically removed. Note that depending on the parameter settings, it takes a certain number of samples to detect the end of an IR sequence. In one embodiment, extra samples (i.e. those samples beyond the minimum number of samples needed to make the end IR sequence determination) can be removed from the data written to the data FIFO. Bits 24:21 of IR control register 211 can indicate the number of samples measured as "backoff words". For example, if sel_end_seq_unit_win (bit 8)=0, sel_end_seq_win (bit 15)=1 and end_seq_thr (bits 20:16)=22, then the minimal number of samples to detect the end of an IR sequence would be 10*22=220 samples=220/32 words=6.75 words. Because there is one word already stored in the input registers, 5 words (6.7−1=5.57→5)(a default/reset value indicating the number of backoff words) can be removed from the data FIFO. This deletion results in no data loss, because the end of transmission is defined as a selectable period wherein no data is transmitted or detected. Bits 31:25 of IR control register 211 can be reserved.

Referring back to FIG. 2, if transmitter 200 is coupled to an end device (e.g. television 101 in FIG. 1), then CPU 201 can run software to control the gathering of input data from data FIFO 209 and the subsequent transforming of that input data into a high-priority packet for transmission via streaming data bus 207. In one embodiment, interrupts may be used to signal the availability of input data. For example, IR logic 214 of IR receive & transmit block 202 can trigger an interrupt after the end of an IR sequence.

Figure 5:
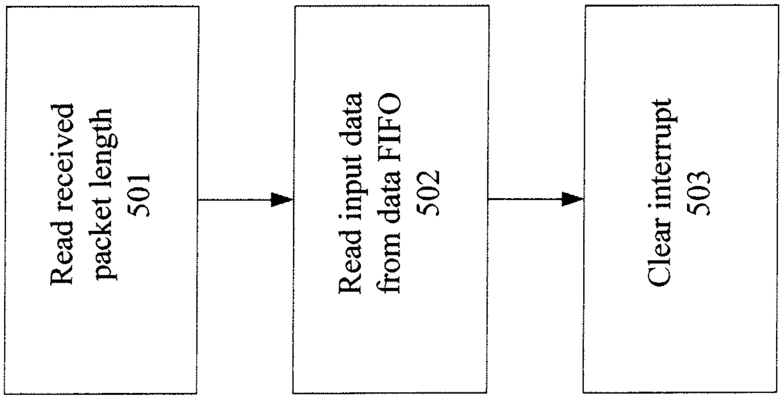
FIG. 5 illustrates exemplary steps for servicing an interrupt.

FIG. 5 illustrates exemplary steps for servicing an interrupt. In step 501, CPU 201 (FIG. 2) can read the received packet length from an IR_PKTLEN register 212. In one embodiment, the value stored by IR_PKTLEN register 212 can be the total number of words in the packet. In step 502, CPU 201 can read the input data from data FIFO 209. In one embodiment, the input data may be read sequentially starting from offset 0x0000 and continuing through offset 4*W-4, wherein W is the word count read from IR_PKTLEN register 212 in step 501. Note that although the data FIFO stores samples as bytes, the transceiver is designed to operate on words. Thus, for example, all offsets are calculated as bytes whereas accessing is performed using words, wherein each word is 4 bytes or 32 bits. Step 503 can clear the IR interrupt assertion.

In contrast, if transmitter 200 is coupled to a source device (e.g. DVD player 114 in FIG. 1), then CPU 201 can run software to control receiving high-priority packets and the transformation into data for transmission from IR LED & photodiode 208. In one embodiment, IR logic 214 of IR receive & transmit block 202 can trigger an interrupt when the transmission completes. CPU 201 can read an IR status (IR_STS) register 213 (or, alternatively, an IR control (IR_CTL0) register) to clear the interrupt assertion.

Figure 6:
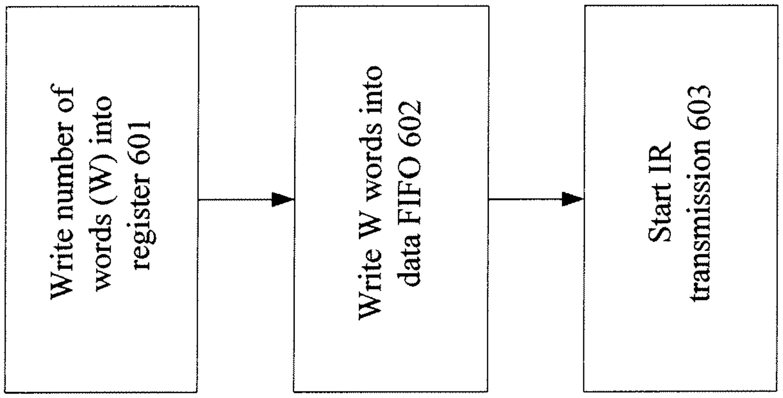
FIG. 6 illustrates exemplary steps for transmitting an IR control signal.

FIG. 6 illustrates exemplary steps for transmitting an IR control signal. In step 601, CPU 201 can write the value of W to IR_PKTLEN register 212 at offset 0x07fc, wherein W specifies the number of words in the packet to be transmitted. The write to IR_PKTLEN informs IR logic 214 of the number of words to be written to data FIFO 209.

In step 602, CPU 201 can write all W words of the transmit packet into data FIFO 209 using IR packet data addresses (i.e. register/memory addresses on-chip). In one embodiment, these writes may be performed sequentially, starting at offset 0x0000 and continuing through offset 4*W-4. In one embodiment, the maximum number of words (that is, the maximum value of W) is 64. Once IR logic 214 in IR receive & transmit block 202 detects the write of the final (Wth) write, IR transmission can begin in step 603.

Note that in some embodiments, the software may send an IR receiver sampling rate and polarity data to IR LED & photodiode 208 during an initialization phase preceding step 601.

Although illustrative embodiments of the invention have been described in detail herein with reference to the accompanying figures, it is to be understood that the invention is not limited to those precise embodiments. They are not intended to be exhaustive or to limit the invention to the precise forms disclosed. As such, many modifications and variations will be apparent.

For example, although embodiments herein are illustrated in the context of a wireless media communication system, it should be understood that identical or substantially similar techniques may be advantageously used over other digital media streaming communication channels or processes. Moreover, although remote control technology can be implemented using IR signals, other implementations could include, without limitation, acoustic, visible light, or even ultra-low-power RF signals (e.g. Bluetooth). In one embodiment, the out of line of sight technologies used to send/receive remote control signals can be different for the end/source devices.

Figure 7A:
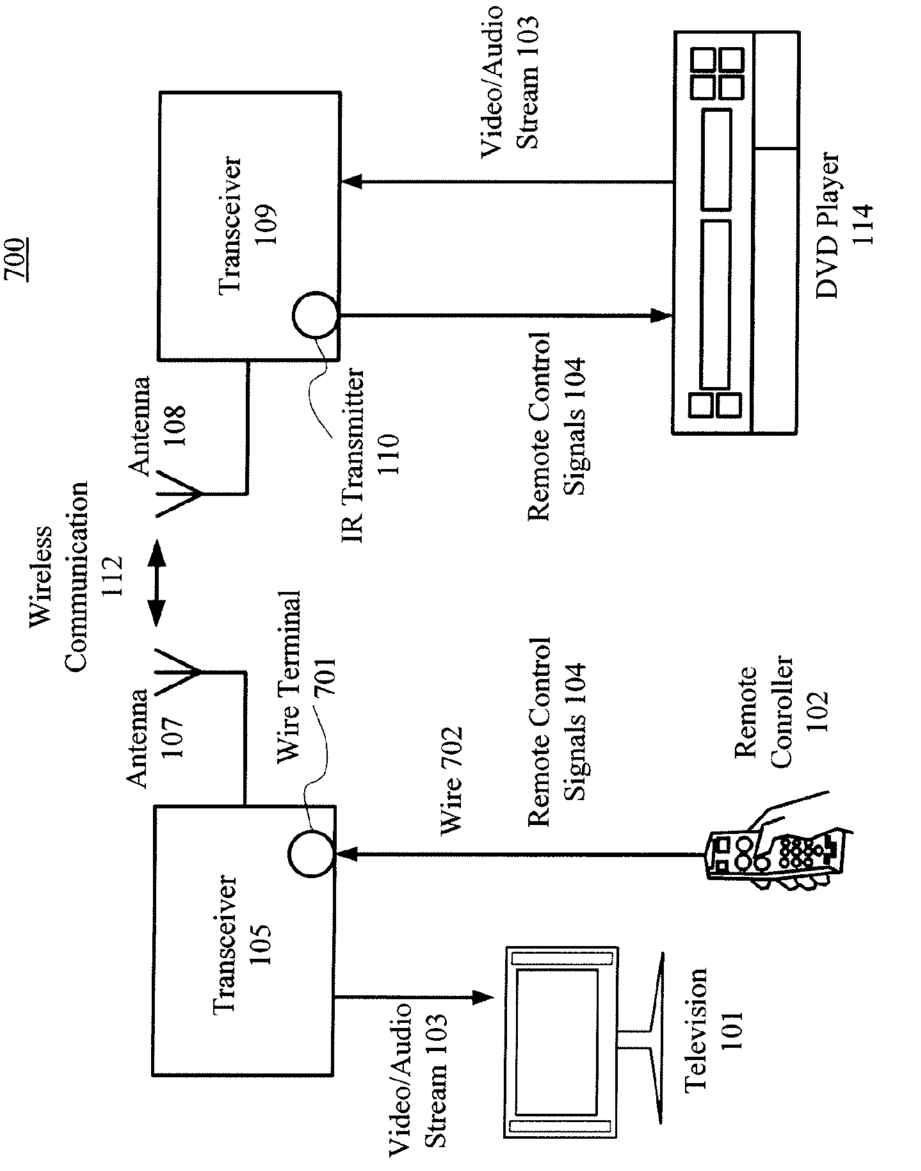
FIG. 7A illustrates an exemplary system in which at least one transceiver can include a wire receiver for receiving remote control signals from a remote controller via a wire.

In another embodiment, at least one of the transceivers can include a wire receiver/transmitter in instead of or in addition to an IR receiver/transmitter. FIG. 7A illustrates an exemplary system 700 in which transceiver 105 can include a wire terminal (generically, called a receiver) 701 that receives remote control signals 104 from remote controller 102 via a wire 702.

Figure 7B:
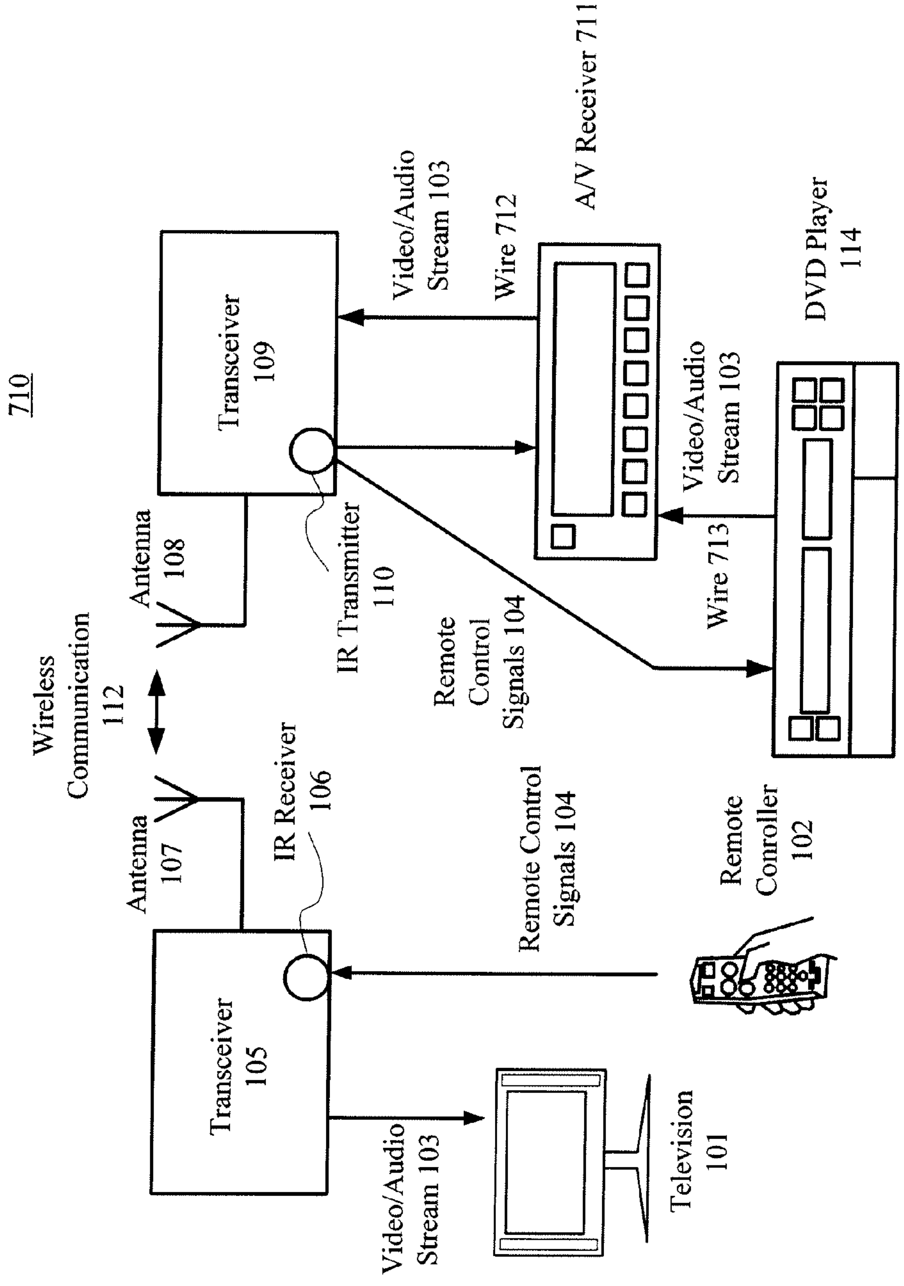
FIG. 7B illustrates an exemplary system in which at least one transceiver can communicate with multiple devices using line of sight technology.

In yet another embodiment, FIG. 7B illustrates another exemplary system 710 in which DVD player 114 can be connected to an audio/video (A/V) receiver 711 (via a wire 713), wherein A/V receiver 711 can be connected to transceiver 109 (via a wire 712). Video/audio stream 103 can be transferred to transceiver 109 via wires 713 and 712. In this embodiment, IR transmitter 110 can communicate using a line of sight technology to communicate with DVD player 114 and/or A/V receiver 711. Notably, because transceivers 105 and 109 perform no interpretation of remote control signals 104, the recreated remote control signals can be simply interpreted by one source device and ignored by any other source device (e.g. a remote control signal for DVD player 114 would be ignored by A/V receiver 711).

In one embodiment and referring back to FIG. 2, to ensure that streaming data takes precedence over other communications, IR logic 214 can place remote control signals 104 (FIG. 1) on streaming data bus 207 (via wireless data transceiver block 203) before CPU 201 generates an acknowledgement (ACK) packet that would normally be sent to the source device after receipt of a streaming data packet, thereby ensuring that the source device responds to remote control signals 104 before sending another streaming data packet.

In yet another embodiment, wireless data transceiver block 203 can include multiple queues 221, 222, and 223, wherein queue 221 could line up lower priority signals (e.g. non-streaming data signals), queue 222 could line up higher priority signals (e.g. streaming data signals), and queue 223 could line up highest priority signals (e.g. command signals). In this embodiment, if any signals are present in highest priority queue 223, then those signals are sent before any signal present in higher priority queue 222. Similarly, if any signals are present in higher priority queue 222, then those signals are sent before any signal present in lower priority queue 221.

Note that an IR signal is relatively slow, e.g. 2 kHz square wave. However, this IR signal is actually "chopped" at a 38 kHz rate to avoid interference. A commercially available implementation of a photodiode assembly can have a 38 kHz "chop" feature, i.e. component(s) that can remove the 38 kHz chop. In one embodiment, this chop feature can be included in IR transmitter 110 (FIG. 1), but not IR receiver 106.

Accordingly, it is intended that the scope of the invention be defined by the following Claims and their equivalents.

The invention claimed is:

1. A method of providing a remote control signal associated with an end device to a source device, the source device being capable of sending the end device streaming data using a wireless communication network, the method comprising:

detecting the remote control signal, transforming the remote control signal into a wireless signal, and transmitting the wireless signal using a first portion of the wireless communication network, wherein the first portion of the wireless communication network is associated with the end device;

receiving the wireless signal and transforming the wireless signal into a recreated remote control signal using a second portion of the wireless communication network, wherein the second portion of the wireless communication network is associated with the source device, and wherein the recreated remote control signal can control the source device; and storing at least one of the remote control signal and the recreated remote control signal in a FIFO; and storing successive samples of the streaming data in the FIFO.

2. The method of claim 1, further including:

determining whether a transceiver forming part of the wireless communication network functions as the first portion or the second portion.

3. The method of claim 1, wherein at least one of the remote control signal and the recreated remote control signal is transferred over wire.

4. The method of claim 1, wherein at least one of the remote control signal and the recreated remote control signal is transferred using IR technology.

5. A system for providing a remote control signal to a source device, the source device being capable of sending an end device streaming data using a wireless communication network, the system comprising:

a first transceiver for detecting the remote control signal, transforming the remote control signal into a wireless signal, and transmitting the wireless signal; and a second transceiver for receiving the wireless signal and transforming the wireless signal into a recreated remote control signal, thereby allowing the end device to be outside the line of sight of the source device, each of the first and second transceivers including a data FIFO for storing successive samples of the streaming data, wherein the wireless communication network includes the first and second transceivers.

6. The system of claim 5, wherein at least one of the first and second transceivers includes:

a wired terminal for one of receiving the remote control signal and transmitting the recreated remote control signal.

7. The system of claim 5, wherein at least one transceiver includes means for directing that transceiver to act as a transmitter or as a receiver of the remote control signal.

8. A method of providing remote control signals to a source device, the source device being capable of sending an end device streaming data using a wireless communication network, the wireless communication network including a first intermediate device and a second intermediate device, the method comprising:

transferring the remote control signals from the end device to the first intermediate device using a first line of sight technology;

transferring the remote control signals between the first and second intermediate devices using the wireless communication network; and transferring the remote control signals from the second intermediate device to the source device using a second line of sight technology; and storing successive samples of the streaming data in FIFOs of the first and second intermediate devices.

9. The method of claim 8, wherein the first and second line of sight technologies are infrared technologies.

10. The method of claim 8, wherein the first and second line of sight technologies are different.

11. The method of claim 8, wherein the first and second line of sight technologies include at least one of infrared, acoustic, and visible light technologies.

12. A method of processing a remote control signal, the method comprising:

receiving the remote control signal using a line of sight technology;

transforming the remote control signal into a wireless communication, wherein the wireless communication uses a radio frequency technology; and receiving successive samples of streaming data over the wireless communication for storage in a FIFO, the successive samples being provided in response to the remote control signal, wherein the line of sight technology is infrared (IR) signals, and wherein transforming the remote control signal includes determining and designating a polarity of the IR signals for the wireless communication.

13. The method of claim 12, wherein the designating includes setting a bit in an IR control register.

14. The method of claim 12, wherein the wireless communication conforms to an IEEE 802.11 standard.

15. A method of processing a wireless communication, the method comprising:

receiving the wireless communication using a radio frequency technology;

transforming the wireless communication into a remote control signal, the remote control signal using a line of sight technology; and storing successive samples of streaming data, which were provided based on the remote control signal.

16. The method of claim 15, wherein the line of sight is one of infrared, acoustic, and visible light technologies.

17. The method of claim 15, wherein the wireless communication conforms to an IEEE 802.11 standard.

18. A system for processing a remote control signal, the system comprising:

means for receiving the remote control signal using a line of sight technology;

means for transforming the remote control signal into a wireless communication, wherein the wireless communication uses a radio frequency technology; and means for receiving successive samples of streaming data over the wireless communication for storage, the successive samples being provided in response to the remote control signal, wherein the line of sight technology is infrared signals, and wherein the means for transforming includes means for determining and designating a polarity of the IR signals for the wireless communication.

19. The system of claim 18, wherein the means for determining and designating includes means for setting a bit in an IR control register.

20. The system of claim 18, wherein the wireless communication conforms to an IEEE 802.11 standard.

21. The system of claim 18, wherein the system is implemented on at least one integrated circuit.

22. The system of claim 18, wherein the system is implemented as a transceiver.

23. A system for processing a wireless communication, the system comprising:

means for receiving the wireless communication using a radio frequency technology; and means for transforming the wireless communication into a remote control signal, the remote control signal using a line of sight technology; and means for receiving successive samples of streaming data for storage, the successive samples being provided in response to the remote control signal.

24. The system of claim 23, wherein the line of sight is one of infrared, acoustic, and visible light technologies.

25. The system of claim 23, wherein the wireless communication conforms to an IEEE 802.11 standard.

26. The system of claim 23, wherein the system is implemented on at least one integrated circuit.

27. The system of claim 23, wherein the system is implemented as a transceiver.

28. A method of processing a remote control signal, the method comprising:

detecting the remote control signal, wherein the remote control signal is associated with an end device, and wherein the end device can receive streaming data from a source device over a wireless communication network;

transforming without interpretation the remote control signal into a wireless signal;

transmitting the wireless signal using the wireless communication network; and saving successive samples of the streaming data in a FIFO.

29. The method of claim 28, further comprising:

automatically removing predetermined samples in the FIFO.

30. A method of providing remote control signals to a source device, the source device being capable of sending an end device streaming data using a wireless communication network, the wireless communication network including a first intermediate device and a second intermediate device, the method comprising:

transferring the remote control signals from the end device to the first intermediate device using a wired technology;

transferring the remote control signals between the first and second intermediate devices using the wireless communication network;

transferring the remote control signals from the second intermediate device to the source device using a line of sight technology; and storing successive samples of the streaming data in a FIFO of at least one of the first intermediate device and the second intermediate device.

* * * * *